Feb. 27, 1968 N. R. POWELL 3,371,281

FREQUENCY MODULATION RECEIVER COMBINING FREQUENCY FEEDBACK AND SYNCHRONOUS DETECTION

Filed Oct. 24, 1963 2 Sheets-Sheet 1

INVENTOR:
NOBLE R. POWELL,
BY Marvin D. Goldenberg
HIS ATTORNEY.

INVENTOR:
NOBLE R. POWELL,
BY Marvin L. Goldenberg
HIS ATTORNEY.

3,371,281

FREQUENCY MODULATION RECEIVER COMBINING FREQUENCY FEEDBACK AND SYNCHRONOUS DETECTION

Noble R. Powell, North Syracuse, N.Y., assignor to General Electric Company, a corporation of New York Filed Oct. 24, 1963, Ser. No. 318,569
5 Claims. (Cl. 325—346)

ABSTRACT OF THE DISCLOSURE

A frequency modulation receiver particularly suitable for long range communications, employing feedback techniques in the IF and demodulator stages which exhibits good signal to noise ratio and improved threshold performance. The demodulated signal is fed back to control an IF local oscillator frequency for compressing the modulation index of the IF signal, and to control a further local oscillator frequency that is multiplied with said IF signal in a phase detector from the output of which said demodulated signal is derived.

The present invention relates to frequency modulation receivers of high quality and more particularly to FM receivers employing feedback techniques to improve their performance.

In present-day long-range communication systems, receivers are required exhibiting high signal to noise ratios so that communication can be accomplished without excessive quantities of power being supplied to the transmitted signal. It is, further, a common requirement of FM communication systems that the receivers be capable of reproducing a signal at minimum threshhold levels of carrier to noise ratio. Threshold level may be defined as the minimum carrier to noise ratio below which a usable signal to noise ratio at the receiver output cannot be obtained. The latter requirement becomes especially important where the received signal is subject to variations in power level independent of transmitted power, which is typical of modern satellite communication systems. A still further requirement of long range communication receivers is that they be capable of faithfully reproducing the received modulation information in the presence of variations in the carrier frequency which may occur, for example, as a result of transmitter oscillator frequency drift or Doppler shift. It may be recognized that Doppler shift of the carrier and modulation frequencies will occur where there is relative motion between the transmitter and receiver equipments, such as where either or both are airborne.

It has been found that frequency modulation offers many significant advantages with respect to long range communication applications. More specifically, two basic approaches using FM techniques, including numerous modifications thereof, have been investigated by workers in the art in an attempt to optimize performance in meeting the above noted requirements. The first basic approach is a frequency modulation with feedback technique whereby a portion of the demodulated signal is fed back as a control signal to control the frequency of the voltage controlled oscillator applied to the mixer in the last IF stage of the receiver. In this circuit a relatively narrow band IF filter is employed following the last mixer or frequency converter for reducing the noise bandwidth and demodulation is performed by a conventional discriminator following said narrow band IF filter. The circuit is disclosed in detail in an article entitled, "Decreasing the Threshold in FM by Frequency Feedback," by L. H. Enloe, appearing in the Proceedings of the IRE, January 1962. Although the frequency modulation with feedback circuit in its presently developed state represents a significant improvement in the threshold properties of the receiver and is capable of providing good signal to noise ratios at the output, the ability of this circuit to follow carrier drift is limited. Further, whether or not carrier drift is present, it has been found that the design of the IF filter is extremely critical, and the complexity of this design presents a severe limitation in the construction and operation of the circuit.

The second basic approach is a phase locked loop technique whereby a product detector is employed for demodulation. The IF signal from the last IF stage and the output of a voltage controlled oscillator matched in frequency to said IF signal are multiplied by the product detector for producing the demodulated signal at the output. In this system a portion of the demodulated signal is fed back as a control signal for the purpose of controlling the frequency of the voltage controlled oscillator. A detailed disclosure of the indicated circuit is presented in an article entitled, A Threshold Criterion for Phase-Lock Demodulation," by J. A. Develet, Jr., appearing in the Proceedings of the IEEE, February 1963. It has been found that for certain operation, namely for relatively small modulation indexes or low information rates, this circuit provides high performance. However, the circuit is subject to failure for large modulation indexes or high information rates. Because the signal to noise ratio at the receiver output varies in accordance with the transmitter modulation index, the limitation with respect to the modulation index places an upper limit on the signal to noise ratio that can be obtained and also restricts the overall flexibility of the circuit.

It is accordingly an object of the present invention to provide a frequency modulation receiver which has good signal to noise ratio, low carrier to noise threshold level and which has readily met design requirements.

A further object of the present invention is to provide a frequency modulation receiver of the above type which is also well suited for operation in the presence of instability in the received carrier frequency such as due to Doppler shift or transmitter oscillator drift.

A more specific object of the invention is to provide a high quality frequency modulation receiver of the type having a feedback loop for compressing the modulation index which is capable of employing an IF filter circuit of readily met design requirements.

It is still a further specific object of the present invention to provide a high quality frequency modulation receiver of the type having a feedback loop for compressing the modulation index wherein control of various desired characteristics of the circuit is readily accomplished by relatively simple resistance-capacitance adjustments.

In accordance with one embodiment of the invention, the above recited and other objects are accomplished in an FM receiver circuit which includes, following conventional low noise RF and forward IF stages, an IF mixer in the last IF stage to which are coupled the received signal as a first input and the output of a first local voltage controlled oscillator as a second input, the frequency of said first voltage controlled oscillator being made to follow the received signal so as to compress the modulation index of said IF signal. A relatively wide band IF filter circuit having a pass band appreciably wider than the band of the modulation frequencies at the IF is coupled to the output of said mixer, said IF filter providing relatively small phase errors and low distortion as a function of frequency. A phase detector is coupled to the output of said IF filter having the filtered IF signal applied as a first input thereto and the output of a second local voltage controlled oscillator applied as a second input thereto, the second voltage controlled oscillator frequency being made equal to that of said filtered IF signal. A relatively narrow band low frequency filter is coupled to the output of said phase detector for passing the frequency modulation and any carrier drift component products of the detector output. A portion of the output of the low frequency filter is coupled to the first voltage controlled oscillator and a portion is coupled to the second voltage controlled oscillator for controlling the frequencies of said oscillators in accordance with the modulation and carrier frequencies. The receiver output may also be taken from the output of said low frequency filter.

In accordance with a second embodiment of the invention, in lieu of the above referred to connection from the output of the low frequency filter to the first voltage controlled oscillator, a portion of the output of the second voltage controlled oscillator is coupled to a discriminator, with the output of said discriminator coupled to the first voltage controlled oscillator for controlling the frequency thereof in accordance with said modulation and carrier frequencies.

While the specification concludes with claims particularly pointing out and distinctly claiming the invention, it is believed that the invention will be better understood from the following description taken in connection with the accompanying drawings in which:

Figure 1:
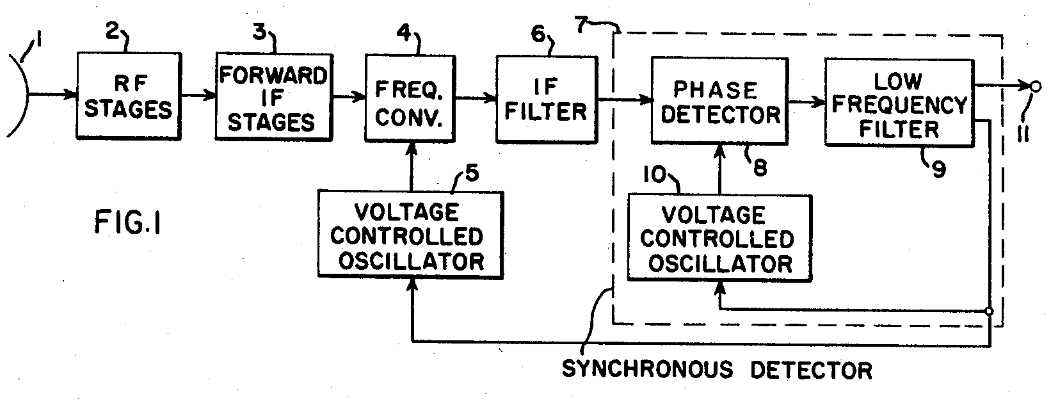
FIGURE 1 is a schematic block diagram of one embodiment of a frequency modulation receiver circuit in accordance with the invention.

Referring now to FIGURE 1 there is illustrated in schematic block diagram form a first embodiment of a frequency modulation receiver circuit in accordance with the invention. The disclosed receiver is particularly useful for long range communication applications where the received signal strength is normally low and, in addition, where the signal strength may be variable. The circuit is also capable of readily following changes in the carrier frequency due, for example, to Doppler shift or transmitter oscillator drift. The illustrated receiver circuit has, therefore, particular application to satellite communication systems.

Figure 2A:
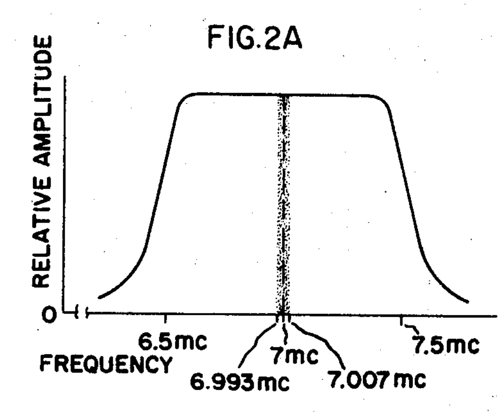
FIGURE 2A is a graph showing the transfer characteristics of the IF filter in the embodiments of FIGURES 1 and 6.

An antenna 1 picks up the received signal and applies it to the RF stages 2 of the receiver, the output of the RF stages being coupled to the forward IF stages 3. The RF and forward IF stages 2 and 3 may be conventional components designed for low noise figure operation which amplify and down convert the received signal. The output of the forward IF stages 3 is coupled as a first input to a frequency converter or mixer 4 of the last IF stage having as a second input thereto the output of a first voltage controlled oscillator 5. The center frequency of the oscillator 5 is offset by a typical amount from the carrier component frequency of the IF output from stages 3, the instantaneous oscillator frequency being made to follow the IF modulation frequencies as well as any carrier drift. The two inputs are beat in mixer 4 to provide a further down conversion of the IF signal and a compression of the modulation index of the IF signal at the output of said mixer. The output of the mixer 4 is coupled to the input of a relatively wide band IF filter circuit 6. In practice, filter circuit 6 normally includes an IF amplifier having applied thereto AGC or limiting functions, or both. It is shown as merely a filter circuit to facilitate explanation. The bandwidth of the filter circuit 6 is many times wider, typically one to two orders of magnitude, than is necessary to pass the carrier and modulation frequencies at the IF but not so wide as to pass the unwanted mixer components. The transfer characteristics of the IF filter are illustrated in FIGURE 2A and will be discussed in greater detail presently.

Figure 3A:
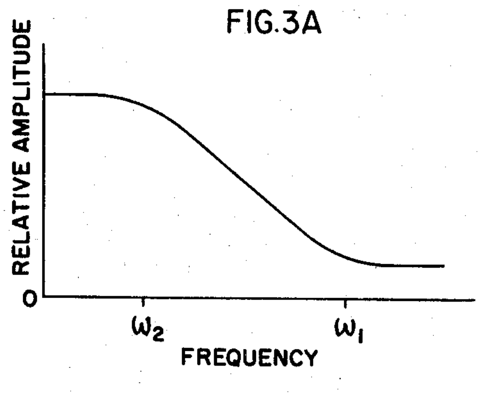
FIGURE 3A is a graph showing the transfer characteristics of a preferred low frequency filter employed in the embodiments of FIGURES 1 and 6.

The output of IF filter 6 is applied to a synchronous detector 7, which may be also identified as a synchronous filter. Synchronous detector 7 comprises a phase locked loop including a product detector 8 of conventional type, which is a form of phase detector providing an output voltage that is a function of the phase difference of the inputs applied thereto, said output voltage being the demodulated signal. Also included in the phase locked loop are a low frequency filter 9 and a second voltage controlled oscillator 10. The synchronous detector 7 follows the instantaneous excursions of the modulation as well as any carrier drift that may be present, and thereby effectively filters out the modulation components of the IF signal fed thereto. Specifically, the output of IF filter 6 is coupled as a first input to product detector 8 which has applied as a second input the output of the second voltage controlled oscillator 10. The frequency of the voltage controlled oscillator 10 is made the same as the modulated IF input to product detector 8. The product of the two inputs produces a voltage component at the output of detector 8 that includes the demodulated information plus DC information that is a function of relatively slow variations of the carrier frequency. The output of product detector 8 is coupled to the input of low frequency filter 9 which passes the modulation frequencies and DC component, and rejects noise. Filter 9 may be a low-pass type filter or other suitable filter network for passing whatever frequency band may be of interest. The transfer characteristics of a preferred form of low frequency filter used in an operating embodiment to be considered is illustrated in FIGURE 3A. A first portion of the output of filter 9 is coupled to the second voltage controlled oscillator 10 for controlling the frequency and phase of said oscillator, and a second portion of the output of said filter is coupled to the first voltage controlled oscillator 5 for controlling predominantly the frequency of said oscillator. The connection to the oscillator 5 is in a negative feedback relation and completes what may be identified as the primary feedback loop of the circuit. The connection to the oscillator 10 is in a negative feedback relation and completes the phase locked loop of the synchronous detector 7. The receiver output may be also obtained from the output of the filter 9, the output being available at terminal 11.

It is noted that the control signal for voltage controlled oscillator 10 may alternatively be taken from the output of product detector 8, rather than the output of filter 9, depending on the nature of the modulation, whether frequency or phase, and whether pre-emphasis or de-emphasis functions are employed.

Although no specific amplification functions are illustrated in the schematic block diagram of FIGURE 1, it may be appreciated that amplifiers will normally be inserted in the circuit as necessary for providing the gain that is dictated by a proper design.

Figure 4:
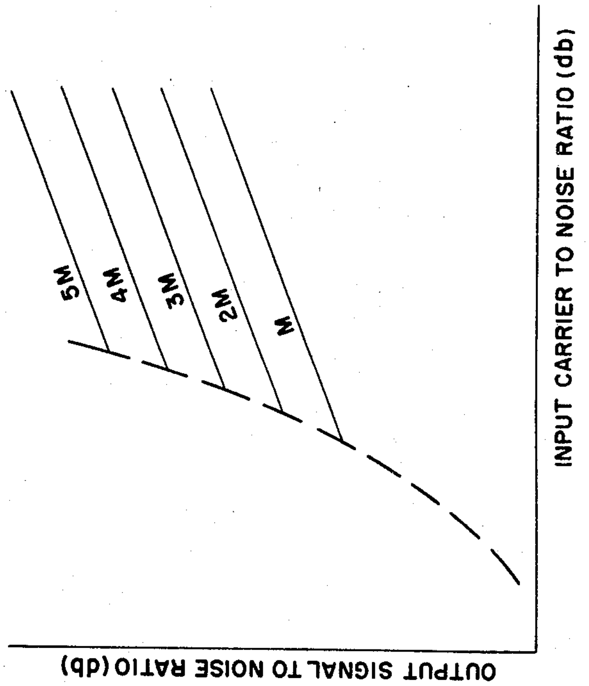
FIGURE 4 is a graph of signal to noise ratio vs. carrier to noise ratio applicable to the receivers of the present invention.

In the operation of the circuit of FIGURE 1 a frequency modulated signal is coupled through RF stages 2 and forward IF stages 3, in the process being amplified and the carrier frequency down converted to an IF frequency. In one operating embodiment there was employed an RF carrier frequency of about 3000 mc., an IF frequency out of stages 3 of 30 mc., a maximum information rate of modulation frequency $\omega_m$ of 3 kc. having a maximum deviation frequency of 30 kc. providing a modulation index of 10. The voltage controlled oscillator 5 had a center frequency of 37 mc. which frequency is deviated in accordance with the modulation frequency that is fed back in the form of a control signal through the primary feedback loop. Accordingly, a compression of the transmitted modulation index is effected which permits the employment of higher transmitted modulation indexes than otherwise feasible, providing higher signal to noise ratios at the receiver output. Reference is made to FIGURE 4 which shows a plot of signal to noise ratio vs. carrier to noise ratio for different transmitter modulation indexes. The broken line represents the locus of threshold levels over a range of modulation indexes. It is seen that as the transmitted modulation index M is increased, higher signal to noise ratios are obtained for given carrier to noise ratios (although the threshold also is seen to increase which may place a limit on the highest modulation index selected). By effecting an appreciable modulation index compression by means of the primary feedback loop, relatively large transmitted modulation indexes may be employed and yet the synchronous detector 7 can be readily designed to track the modulations.

With respect to the foregoing considerations, there may be derived for the circuit of FIGURE 1 the expression $(K_f+1)K_s\alpha M\omega_m^2$, where $K_f$ is the gain of the primary feedback loop and $K_s$ is the gain of the synchronous detector phase locked loop, $K_s$ being normally many orders of magnitude greater than $K_f$. $(K_f+1)$ is the compression factor applied to the modulation deviations. From the above expression it is seen that two loop gain controls are available for satisfying a given modulation index, modulation frequency set of parameters, which provides considerable flexibility to the overall circuit.

Referring again to FIGURE 1 and the operating embodiment being considered, the output of mixer 4 had a center difference frequency of 7 mc., with frequency modulations exhibiting a compressed modulation index equal to about 2½, the loop gain $K_f$ being 3. Thus, the maximum deviation about 7 mc. carrier was at about 7 kc. The IF filter 6 had a center frequency of 7 mc. and a bandwidth of 1 mc., which is more than one order of magnitude wider than that necessary to pass the modulation band at the IF. The modulation band, by convention, is defined as that bandwidth which contains all modulation components excepting those whose amplitude is less than 10% of the largest amplitude within the bandwidth. It is approximately equal to $$2\left(\frac{M}{K_f+1}\right)\omega_m$$

As shown in FIGURE 2A which presents the IF filter transfer characteristics as a plot of relative amplitude, i.e., amplitude out over amplitude in, vs. frequency, the compressed modulation band is on the order of 15 kc.

Figure 2B:
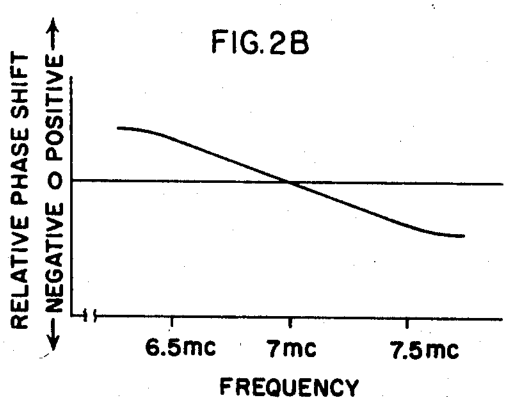
FIGURE 2B is a graph of the phase error vs. frequency characteristic for the IF filter in the embodiments of FIGURES 1 and 6.

In FIGURE 2B there is illustrated a plot of phase error vs. frequency for the IF filter. The curve is seen to have a linear portion around the center frequency of the filter and nonlinear portions at the peripheral frequencies. The slope of the curve is a function of filter bandwidth, being inversely proportional thereto. Further, the predominance of the nonlinear portions is inversely related to bandwidth. Accordingly, by employing a wideband IF filter, such as IF filter 6, both phase error, which if excessive may drive the loop unstable, and distortion introduced to the signal by the filter are maintained low. These characteristics of the filter appreciably relax the filter design constraints, as compared to the conventional narrow band IF filter required in the previously referred to frequency modulation with feedback circuit, and ensure stability of operation and low distortion of the modulation frequencies. In addition, because the IF filter design is not required to be of a critical nature, design of the amplifier and associated circuit normally included in the IF filter circuit 6 can be more readily perfected. It is noted that a wideband rather than a narrow band IF filter can be employed in the disclosed feedback circuitry without degrading overall circuit performance because of the employment of a synchronous detector in the modulation stage of the receiver, which will be further explained. As will be seen, it is the synchronous detector 7 that provides the critical filtering function for deriving low threshold levels as well as high signal to noise ratios. Since the synchronous detector operation is at the lower frequencies, control of the circuit can be effected by relatively simple R–C adjustments.

Figure 5:
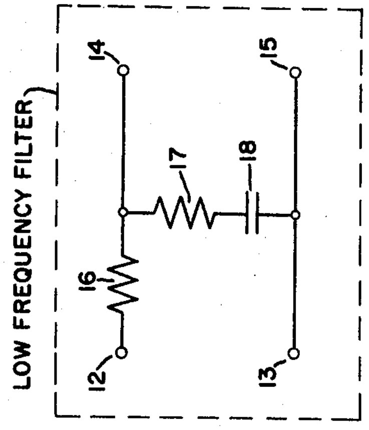
FIGURE 5 is a circuit diagram of a preferred low frequency filter network employed in the embodiments of FIGURES 1 and 6.

The frequency modulation components at IF which are passed by the IF filter 6 are applied to product detector 8 together with the output from voltage controlled oscillator 10. The center frequency of voltage controlled oscillator 10 is the same as the center frequency of the IF filter 6, namely, 7 mc. In addition, voltage controlled oscillator 10 is made to track the modulation frequencies applied to product detector 8. Since the modulation index has been compressed in the mixer 4 operation previously described, the modulation deviations can be more readily followed and therefore the severity in design requirements for the feedback loop of the synchronous detector 7 is reduced. The product detector 8 provides an output voltage which is a function of the difference in phase between the IF signal applied to the detector 8 and the oscillator 10 output. Accordingly, the output from detector 8 includes voltage components corresponding to the modulation information plus any carrier drift information, said voltage components having a frequency in the range of 0–3 kc. In addition there is noise present. Low frequency filter 9, in combination with the remaining components of synchronous detector 7 in their closed loop configuration, serve to pass these frequency components and reject external noise. A preferred filter network that may be employed for the low frequency filter 9 is schematically illustrated in FIGURE 5. This filter readily accommodates both carrier drift and modulation voltage component information. The illustrated network has input terminals 12 and 13 and output terminals 14 and 15 with a resistor 16 connected between terminals 12 and 14. Across terminals 14 and 15 are connected a second resistor 17 in series with a capacitor 18. The transfer characteristic for this filter as a function of frequency is shown in FIGURE 3A. The transfer characteristic may be expressed as $$\frac{1+s/\omega_1}{1+s/\omega_2}$$

where $\omega_1$ is determined by the time constant of resistor 17 and capacitor 18, and $\omega_2$ is determined by the time constant of resistor 16 and 17 and capacitor 18.

Figure 3B:
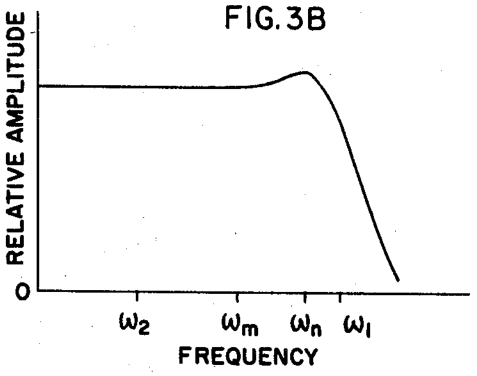
FIGURE 3B is a graph showing the transfer characteristics of the synchronous filter component of the embodiments of FIGURES 1 and 6.

In FIGURE 3B is shown the transfer characteristic as a function of frequency for the synchronous detector 7, which for the following discussion may be best considered as a synchronous filter. The illustrated transfer characteristic is a composite of the low frequency filter and voltage controlled oscillator 10 transfer characteristics as connected in a closed loop. The synchronous filter 7 has a natural frequency of $\omega_n=\sqrt{K_s\omega_2}$ and a damping factor $$\xi=\frac{\sqrt{K_s\omega_2}}{2\omega_1}$$

these being the primary determinative factors of the synchronous filter bandwidth. For the synchronous filter under consideration, the damping factor $\xi$ is approximately .5 so that the filter bandwidth may be considered to be about equal to the natural frequency $\omega_n$.

It is found that the design requirements with respect to the synchronous filter are somewhat in conflict. Thus, as a first consideration, it is desirable that $\omega_n$ be not larger than necessary to pass only the modulation frequencies of interest, thereby minimizing noise bandwidth and providing highest possible signal to noise ratio at the output. As a second consideration, it is recognized that $\omega_n$ is proportional to the phase locked loop gain $K_s$, being related by the expression $\omega_n=\sqrt{K_s\omega_2}$, so that reciting a condition of minimum $\omega_n$ from a noise bandwidth standpoint implies a low gain $K_s$ and a related long loop response time. Low gain and long response time are undesirable since this diminishes the loop's facility to acquire and track the IF signal. Accordingly, a compromise in the design of the filter must be arrived at wherein a desired filter operation is best provided, that is wherein the gain $K_s$ is high enough to support a given $\omega_m$, M and carrier drift while maintaining the noise bandwidth low. In effecting a compromise in the design of the filter, it is found that use of a filter of the type illustrated in FIGURE 5 provides appreciable flexibility since a number of filter parameters are available for adjustment, namely $\omega_1$, $\omega_2$ and $K_s$, which parameters have been shown to determine the value of $\omega_n$ and $\xi$. Nevertheless, it should be recognized that other forms of filter networks may also be employed of varying circuit complexity and corresponding freedom of adjustment. In fact, for less critiial operation, it is possible to delete the filter network and rely on the phase locked loop configuration for the necessary filtering function, in this case there being no adjustment of the filter parameters other than the loop gain.

Of advantage in arriving at a proper filter design, irrespective of the filter network employed, is the loop gain $K_f$ associated with the primary feedback loop and the related modulation index compression previously discussed. Thus, there is permitted a lower phase locked loop gain $K_s$ than otherwise possible, lower by a factor of $(K_f+1)$, and corresponding longer loop response times. Accordingly, for a given low frequency filter network 9 the bandwidth of the synchronous filter 7 can be made appreciably narrower than possible in conventional phase locked loop demodulators, while retaining requisite loop design characteristics, providing a high quality demodulation and avoiding loop instability.

In addition to the above noted improvement relating to bandwidth, the present invention extends the operation with respect to increased values of $\omega_m$ and M over conventional phase locked loop demodulators. As has been previously noted, the conventional demodulators tend to fail for relatively large values of $\omega_m$ or M because of a large loop gain requirement, which is difficult to achieve and tends to result in frequency instability and loop oscillation. Since in the instant circuitry the phase locked loop gain is reduced by a factor of $(K_f+1)$, extended operation is readily realized.

Figure 6:
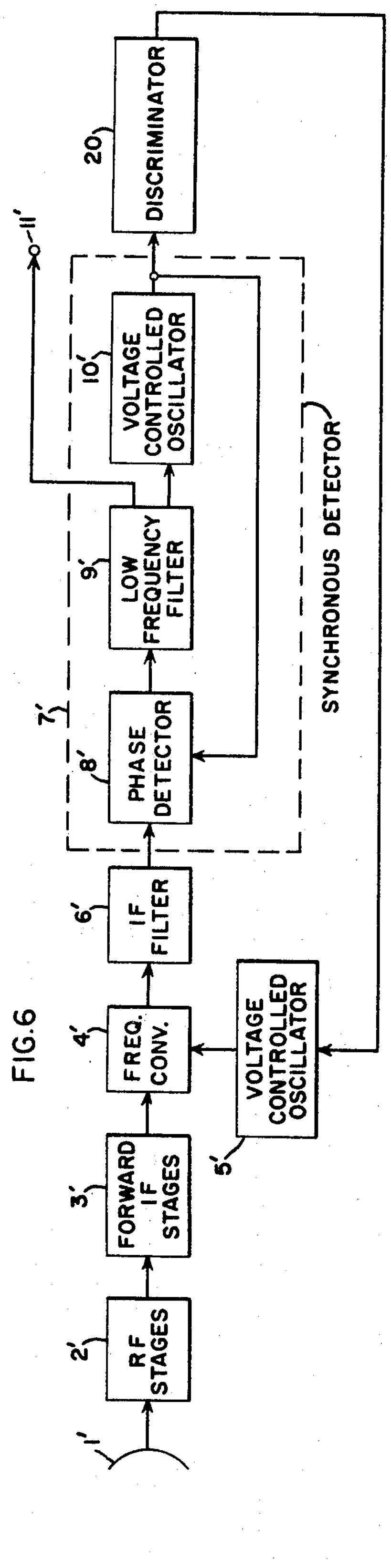
FIGURE 6 is a schematic block diagram of a second embodiment of a frequency modulation receiver circuit in accordance with the invention.

Referring now to FIGURE 6, there is illustrated a second embodiment of the invention. The illustrated circuit differs from the embodiment of FIGURE 1 in that in lieu of the path connecting a portion of the output of low frequency filter 9 to the first voltage controlled oscillator 5, there is provided a path including a discriminator 20 coupled between the output of the second voltage controlled oscillator 10 and the input to voltage controlled oscillator 5 for controlling the frequency of the latter oscillator. The remaining components are identical to those illustrated in FIGURE 1 and are identified by similar reference characters but with an added prime notation. The operation of the circuit of FIGURE 6 is similar to that of FIGURE 1 except that now a portion of the output of voltage controlled oscillator 10 is discriminated for providing the control signal to voltage controlled oscillator 5. In addition, it is noted that the demodulated output can alternatively be taken from the discriminator output. The use of a discriminator in this circuit primarily provides added flexibility in obtaining the requisite gain of the prmary feedback loop and, therefore, in controlling the operation of the overall circuit.

It is noted that the specific operating embodiments disclosed herein are presented by way of example and are not intended in any manner to be limiting of the basic invention set forth. Accordingly, it may be appreciated that although the disclosed circuitry is referred to as a frequency modulation receiver, it may be readily employed for phase modulation transmission. In addition, the disclosed circuitry is useful for a wide range of modulation frequencies and is applicable to pulse modulation transmission of various types as well as voice communication.

The appended claims are intended to include all modifications falling within the true scope and spirit of the invention.

What I claim as new and desire to secure by Letters Patent of the United States is:

1. A frequency modulation receiver circuit for demodulating the information in a received signal characterized by a given modulation index comprising:
   (a) a frequency converter,
   (b) a first voltage controlled oscillator whose center frequency is offset from the carrier frequency of said received signal and having an output controlled to follow said received signal, said output and said received signal being coupled to said frequency converter so as to produce an intermediate frequency signal having a modulation index compressed with respect to said given index,
   (c) intermediate frequency filter means coupled to the output of said frequency converter,
   (d) a phase detector,
   (e) a second voltage controlled oscillator whose center frequency is equal to the carrier frequency of said intermediate frequency signal and having an output controlled to follow the phase of said intermediate frequency signal, the output of said second oscillator and the filtered intermediate frequency signal being coupled to said phase detector so as to provide an ouput therefrom that is a function of the difference in phase between the two inputs to said phase detector, the output of said phase detector containing a first voltage component corresponding to the modulation information and a second voltage component corresponding to carrier frequency drift, the demodulated output signal being derivable from said first voltage component,
   (f) first feedback means for coupling the output of said phase detector including at least said first voltage component to said first voltage controlled oscillator to control the frequency thereof, and
   (g) second feedback means for coupling the output of said phase detector including at least said first voltage component to said second voltage controlled oscillator to control the phase thereof, at least one of said first and second feedback means providing feedback of said second voltage component.

2. A frequency modulation receiver circuit as in claim 1 wherein said intermediate frequency filter means has a bandwidth appreciably greater than the band of modulation frequencies in said intermediate frequency signal.

3. A frequency modulation receiver circuit as in claim 2 wherein said first and second feedback means include a common low frequency filter network.

4. A frequency modulation receiver circuit as in claim 3 wherein said first feedback means includes a path extending between the output of said low frequency filter network and said first voltage controlled oscillator.

5. A frequency modulation receiver circuit as in claim 3 wherein said first feedback means includes a discriminator network coupled between the output of said second voltage controlled oscillator and the input of said first voltage controlled oscillator.

References Cited

UNITED STATES PATENTS

| | | | |
|---|---|---|---|
| 2,777,055 | 1/1957 | Goldberg | 329—50 X |
| 2,924,706 | 2/1960 | Sassler | 329—50 X |
| 2,989,622 | 6/1961 | Doherty | 325—45 |
| 3,001,068 | 9/1961 | Morita et al. | 325—346 |
| 3,069,625 | 12/1962 | Morita et al. | 325—349 |
| 3,207,995 | 9/1965 | Beer et al. | 329—50 X |

WILLIAM C. COOPER, *Examiner.*

R. S. BELL, *Assistant Examiner.*